(12) United States Patent
Goto et al.

(10) Patent No.: US 8,797,734 B2
(45) Date of Patent: Aug. 5, 2014

(54) ELECTRONIC APPARATUS

(75) Inventors: Katsuichi Goto, Kawasaki (JP); Kaito Tanaka, Kawasaki (JP); Hiroyuki Fujita, Kawasaki (JP); Kazuhiro Fujiwara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/336,798

(22) Filed: Dec. 17, 2008

(65) Prior Publication Data

US 2009/0154094 A1 Jun. 18, 2009

(30) Foreign Application Priority Data

Dec. 17, 2007 (JP) .................... 2007-324639

(51) Int. Cl.
- *G06F 1/16* (2006.01)
- *A47B 81/00* (2006.01)
- *G06F 3/02* (2006.01)

(52) U.S. Cl.
USPC ............ 361/679.55; 361/679.26; 361/679.27; 361/679.56; 312/223.1; 312/223.2; 345/168; 345/169; 345/905

(58) Field of Classification Search
USPC .......................... 361/679.27, 679.01–679.45, 361/679.55–679.59; 312/223.1, 223.2; 345/156, 157, 168, 169, 905
See application file for complete search history.

(56) References Cited

U.S. PATENT DOCUMENTS

| | | | | |
|---|---|---|---|---|
| 5,438,475 A * | 8/1995 | Bradley | .................. | 361/679.55 |
| 5,583,742 A | 12/1996 | Noda et al. | | |
| 5,623,390 A | 4/1997 | Noda et al. | | |
| 5,949,643 A * | 9/1999 | Batio | ........................ | 361/679.27 |
| 6,344,967 B2 * | 2/2002 | Zamora et al. | ........... | 361/679.09 |
| 6,665,173 B2 * | 12/2003 | Brandenberg et al. | ... | 361/679.09 |
| 6,693,795 B2 | 2/2004 | Tanaka et al. | | |
| 7,019,964 B1 * | 3/2006 | Maskatia et al. | ......... | 361/679.27 |
| 7,031,146 B2 * | 4/2006 | Tanaka et al. | ............ | 361/679.06 |
| 7,106,580 B2 | 9/2006 | Kugimiya et al. | | |
| 2001/0010620 A1 * | 8/2001 | Zamora et al. | ................ | 361/683 |
| 2003/0076651 A1 | 4/2003 | Tanaka et al. | | |
| 2004/0120110 A1 | 6/2004 | Tanaka et al. | | |
| 2005/0130470 A1 | 6/2005 | Kugimiya et al. | | |

(Continued)

FOREIGN PATENT DOCUMENTS

| | | |
|---|---|---|
| EP | 1304609 | 4/2003 |
| EP | 1555594 | 7/2005 |

(Continued)

OTHER PUBLICATIONS

English translation of Japanese Office Action mailed Dec. 6, 2011 for corresponding Japanese Application No. 2007-324639.

*Primary Examiner* — Nidhi Desai
(74) *Attorney, Agent, or Firm* — Fujitsu Patent Center

(57) ABSTRACT

An electronic apparatus has a trapezoidally shaped first housing having a first side portion, a second side portion, slanted side portions, a bottom surface portion, and a top surface portion, the second side portion having a width smaller than a width of the first side portion and being parallel to the first side portion, the slanted side portions connecting end points of the first side portion with respective end points of the second side portion. The electronic apparatus has a second housing and a connecting portion connecting the first side portion of the first housing with the second housing such that the second housing is capable of being opened and closed with respect to the top surface portion of the first housing.

4 Claims, 24 Drawing Sheets

(56) References Cited

U.S. PATENT DOCUMENTS

2005/0237702 A1* 10/2005 Kee et al. .................. 361/681
2006/0245151 A1* 11/2006 Ooe et al. .................. 361/680
2009/0154081 A1* 6/2009 Goto ....................... 361/679.02
2009/0154085 A1* 6/2009 Goto ....................... 361/679.08

FOREIGN PATENT DOCUMENTS

| JP | 7-168647 A | 7/1995 |
| JP | 11-175236 | 7/1999 |
| JP | 2003-122453 A | 4/2003 |
| JP | 2005-165475 A | 6/2005 |
| JP | 2007-087434 | 4/2007 |

* cited by examiner

ELECTRONIC APPARATUS

CROSS-REFERENCE TO RELATED APPLICATIONS

This application is based upon and claims the benefit of priority from the prior Japanese Patent Application No. 2007-324639 filed on Dec. 17, 2007, the entire contents of which are incorporated herein by reference.

BACKGROUND

Field

Portable electronic apparatuses, such as a laptop personal computer and a mobile phone, include a main housing having a keyboard, push buttons, etc., and a display housing having a display screen. The display housing is connected to the main housing such that the display housing can be opened and closed with respect to the main housing. This type of electronic apparatus can be carried by a user in a folded state in which the display housing is placed on top of the main housing. When the electronic apparatus is used, the user opens the display housing so that the keyboard and the push buttons can be operated. Thus, the portability of the electronic apparatus is ensured without reducing the size of the keyboard and the push buttons.

Recently, portable electronic apparatuses having a fingerprint sensor, a television unit, an audio device, etc. have come into use. The fingerprint sensor is used for personal identification. The audio device is used for recording and reproducing music and video data. Thus, while there is a demand for reducing the size of the electronic apparatuses, there is also a demand for increasing the number of electronic components to be mounted therein. Therefore, it is difficult to provide a space for accommodating newly added electronic components in the housings of the electronic apparatus according to the related art. Therefore, it has become necessary to increase the size of the housings of the electronic apparatus to increase the volumes thereof.

SUMMARY

The disclosed electronic apparatus includes a trapezoidally shaped first housing having a first side portion, a second side portion, slanted side portions, a bottom surface portion, and a top surface portion. The second side portion has a width smaller than a width of the first side portion and is parallel to the first side portion, and the slanted side portions connect end points of the first side portion with respective end points of the second side portion. The disclosed electronic apparatus includes a second housing and a connecting portion connecting the first side portion of the first housing with the second housing such that the second housing is capable of being opened and closed with respect to the top surface portion of the first housing.

Additional aspects and/or advantages will be set forth in part in the description which follows and, in part, will be apparent from the description, or may be learned by practice of the invention.

The above-described embodiments of the present invention are intended as examples, and all embodiments of the present invention are not limited to including the features described above.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF THE PREFERRED EMBODIMENTS

Figure 1:
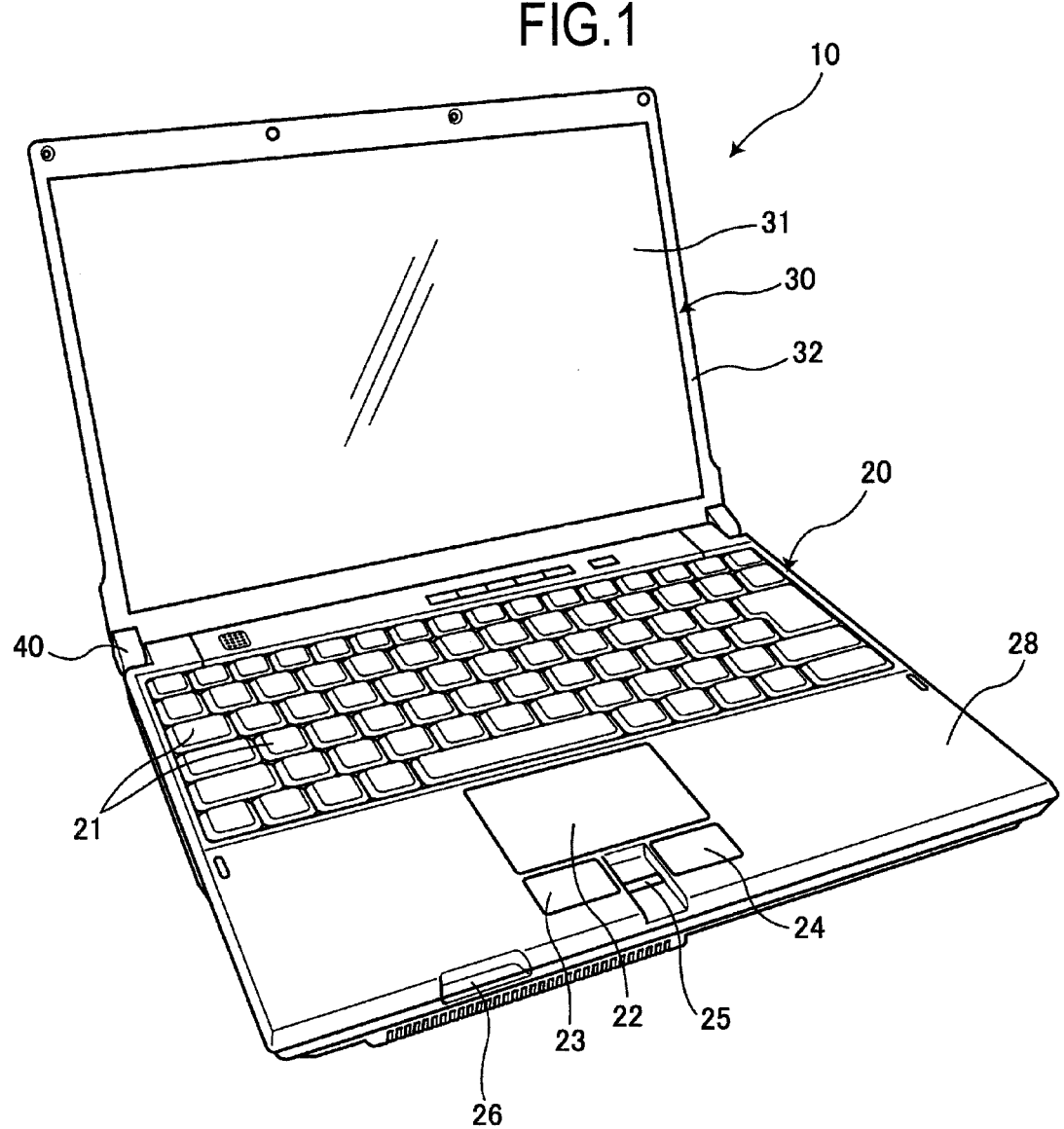
FIG. 1 is a perspective view of a personal computer which corresponds to an electronic apparatus according to a first embodiment.

Reference will now be made in detail to the embodiments, examples of which are illustrated in the accompanying drawings, wherein like reference numerals refer to like elements throughout. The embodiments are described below to explain the present invention by referring to the figures.

Embodiments corresponding to the above-described fundamental and applied aspects will be described with respect to the accompanying drawings.

FIG. 1 is a perspective view of a personal computer 10 which corresponds to an electronic apparatus according to a first embodiment.

The personal computer 10 includes a main unit 20 and a display unit 30. The display unit 30 is connected to the main unit 20 with hinge units 40 such that the display unit 30 can be opened and closed with respect to the main unit 20. The main unit 20 is an example of a main unit according to the present embodiment. The display unit 30 is an example of a display unit according to the present embodiment. The hinge units 40 are an example of a connecting portion according to the present embodiment. FIG. 1 shows the personal computer 10, viewed from the front, in a state in which the display unit 30 is opened.

The main unit 20 performs various information processing operations. A main housing 28 accommodates therein a CPU and a hard disk device. The main housing 28 has a keyboard 21, a trackpad 22, a left click button 23, and a right click button 24 on a top surface thereof. The main housing 28 also has a fingerprint sensor 25 and a medium slot 26 in a front section thereof. The fingerprint sensor 25 is used in a fingerprint authentication operation. The medium slot 26 receives a small recording medium. The main housing 28 is an example of a first housing according to the present embodiment.

The display unit 30 displays the results of the information processing operations performed by the main unit 20. A display housing 32 accommodates therein a thin liquid crystal panel, a control circuit for the liquid crystal panel, and a communication antenna. The display housing 32 includes a front cover 32A and a back cover 32B (see FIG. 2). The liquid crystal panel is placed between the front cover 32A and the back cover 32B in a state such that a display screen 31 thereof faces the front. The display housing 32 is an example of a second housing according to the present embodiment. The display unit 30 is a wide-screen display device having various electronic components disposed behind the liquid crystal panel.

Figure 2:
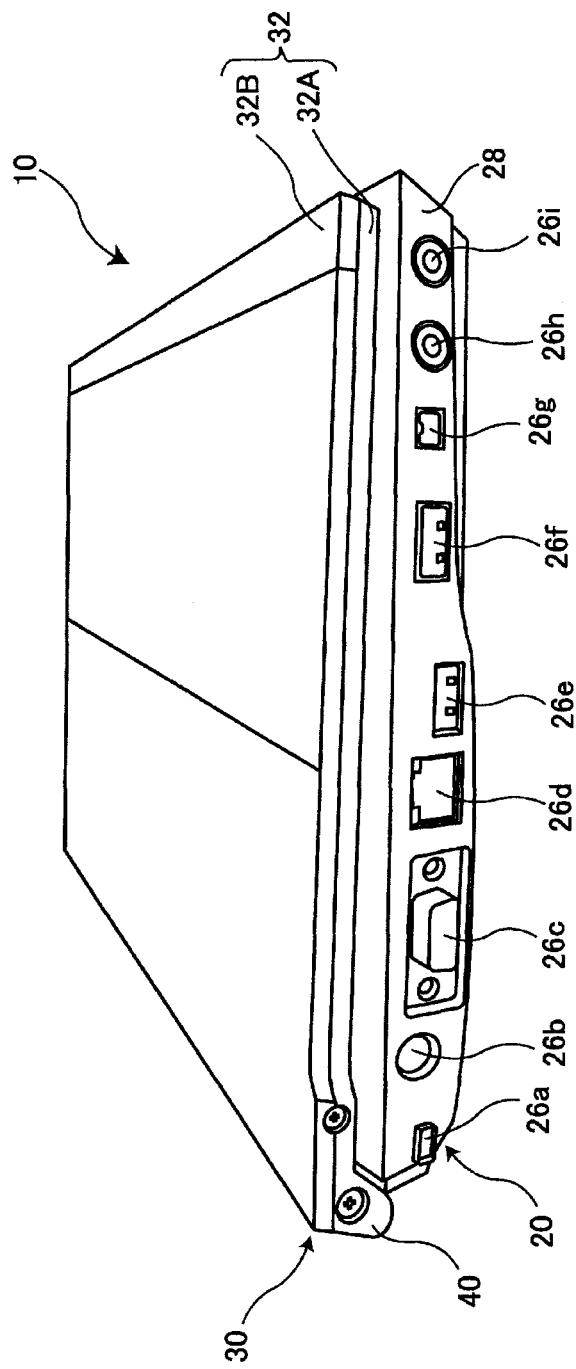
FIG. 2 is a diagram illustrating a side of a personal computer.

FIG. 2 is a diagram illustrating a side of the personal computer 10.

A security slot 26a for a cable lock, a connector 26b for a power supply module, a connector 26c for an external monitor, a connector 26d for a LAN cable, USB connectors 26e and 26f, a connector 26g for an audio jack, a connector 26h for a microphone, and a connector 26i for a headphone are provided on one side of the main unit 20.

Figure 3:
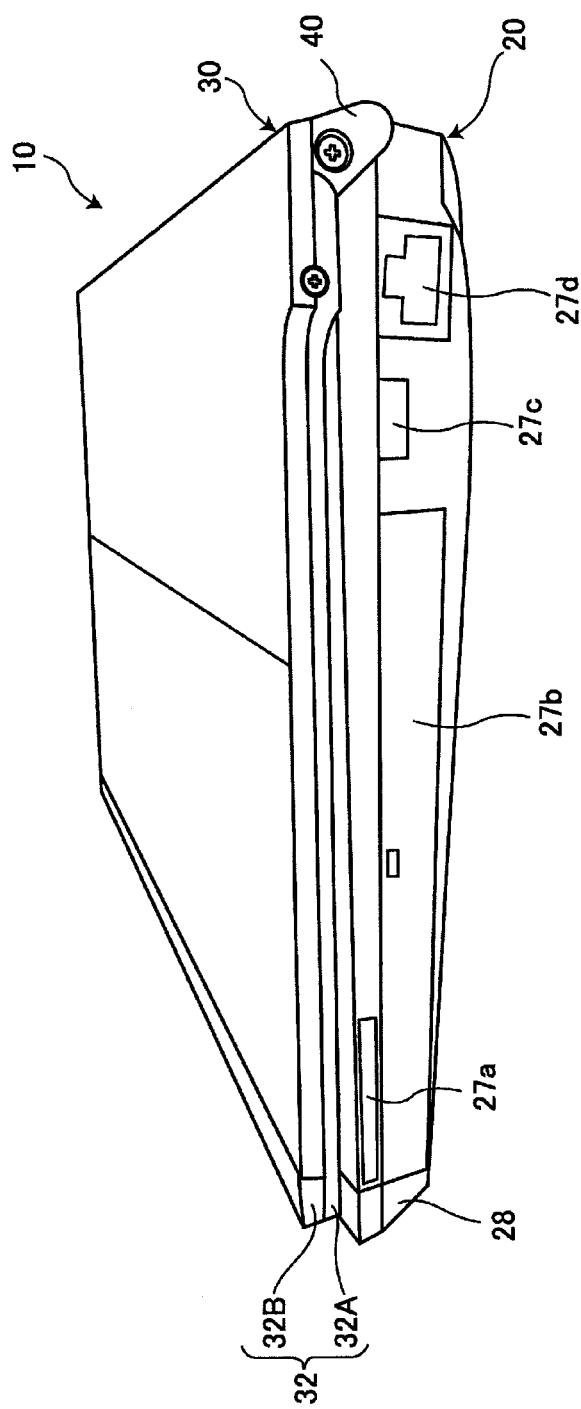
FIG. 3 is a diagram illustrating a side of a personal computer opposite to the side shown in FIG. 2.

FIG. 3 is a diagram illustrating a side of the personal computer 10 opposite to the side shown in FIG. 2.

An expansion card slot 27a, an optical disk slot 27b, a USB connector 27c, and a modem connector 27d are provided on the main unit 20 at the side opposite to the side shown in FIG. 2. The expansion card slot 27a receives an expansion card, such as a LAN card, for feature expansion. The optical disk slot 27b receives an optical disk, such as a CD or a DVD.

The internal structure of the personal computer 10 will now be described.

Figure 4:
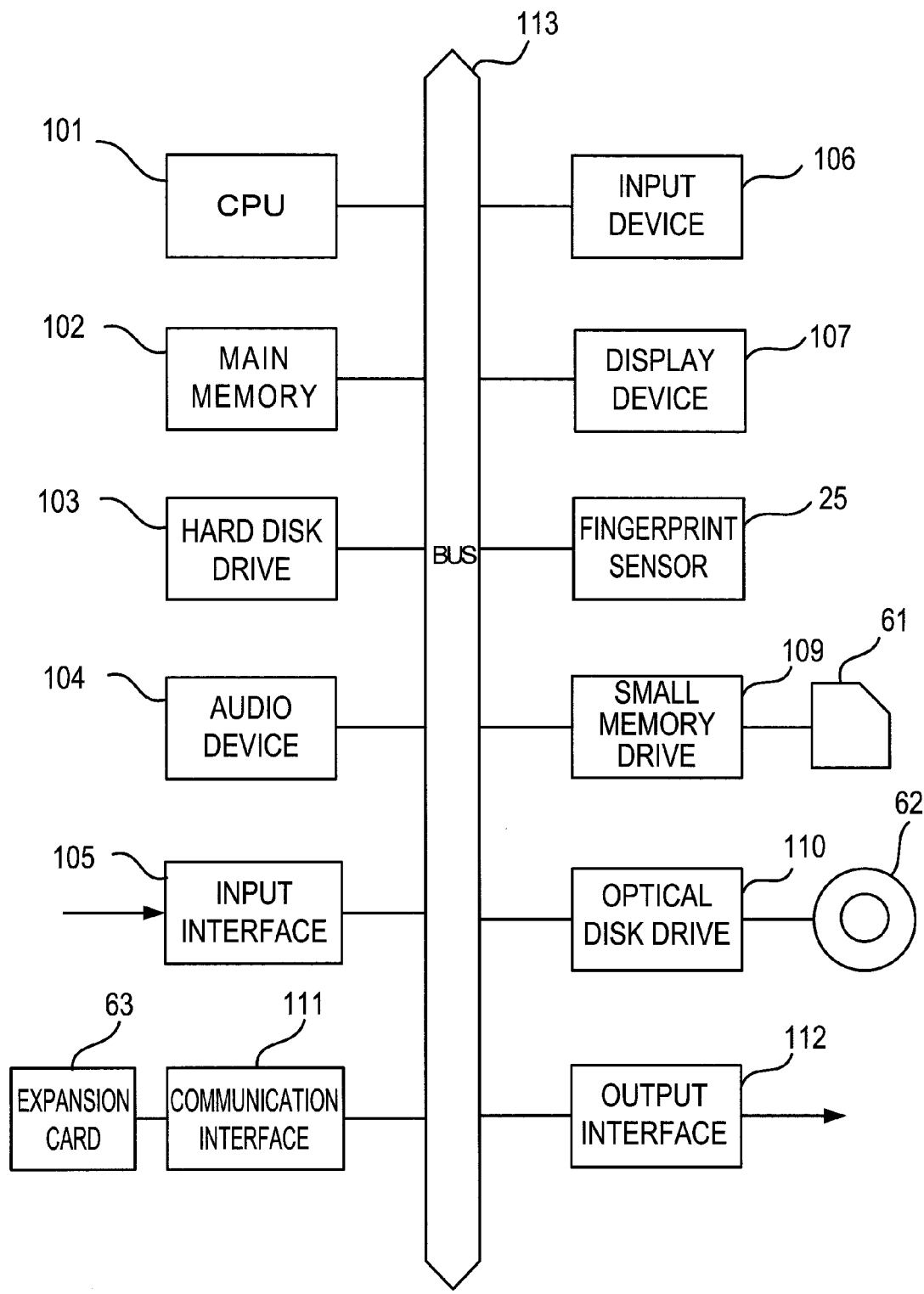
FIG. 4 is a diagram illustrating the internal structure of a personal computer.

FIG. 4 is a diagram illustrating the internal structure of the personal computer 10.

Referring to FIG. 4, the personal computer 10 includes a CPU 101, a main memory 102, a hard disk drive 103, an audio device 104, an input interface 105, an input device 106, a display device 107, the fingerprint sensor 25, a small memory drive 109, an optical disk drive 110, a communication interface 111, and an output interface 112. The CPU 101 executes various programs. The main memory 102 is a memory device in which programs read from the hard disk drive 103 are expanded for execution by the CPU 101. The hard disk drive 103 stores various programs and data. The audio device 104 has a microphone, speakers, etc., mounted therein. The input interface 105 receives data from an external device. The input device 106 includes the keyboard 21 and the trackpad 22. The display device 107 displays information on the display screen 31. The small memory drive 109 is used to access a small recording medium 61 attached thereto. The optical disk drive 110 is used to access a CD-ROM 62 or a DVD attached thereto. The communication interface 111 provides communication through an expansion card 63. The output interface 112 outputs data to an external device. The above-mentioned elements are connected to each other through a bus 113.

The personal computer 10 according to the present embodiment incorporates various devices for reducing the size and weight of the apparatus, increasing the strength thereof, and improving the operability thereof. First, a device for increasing the strength of the personal computer 10 will now be described.

Figure 5:
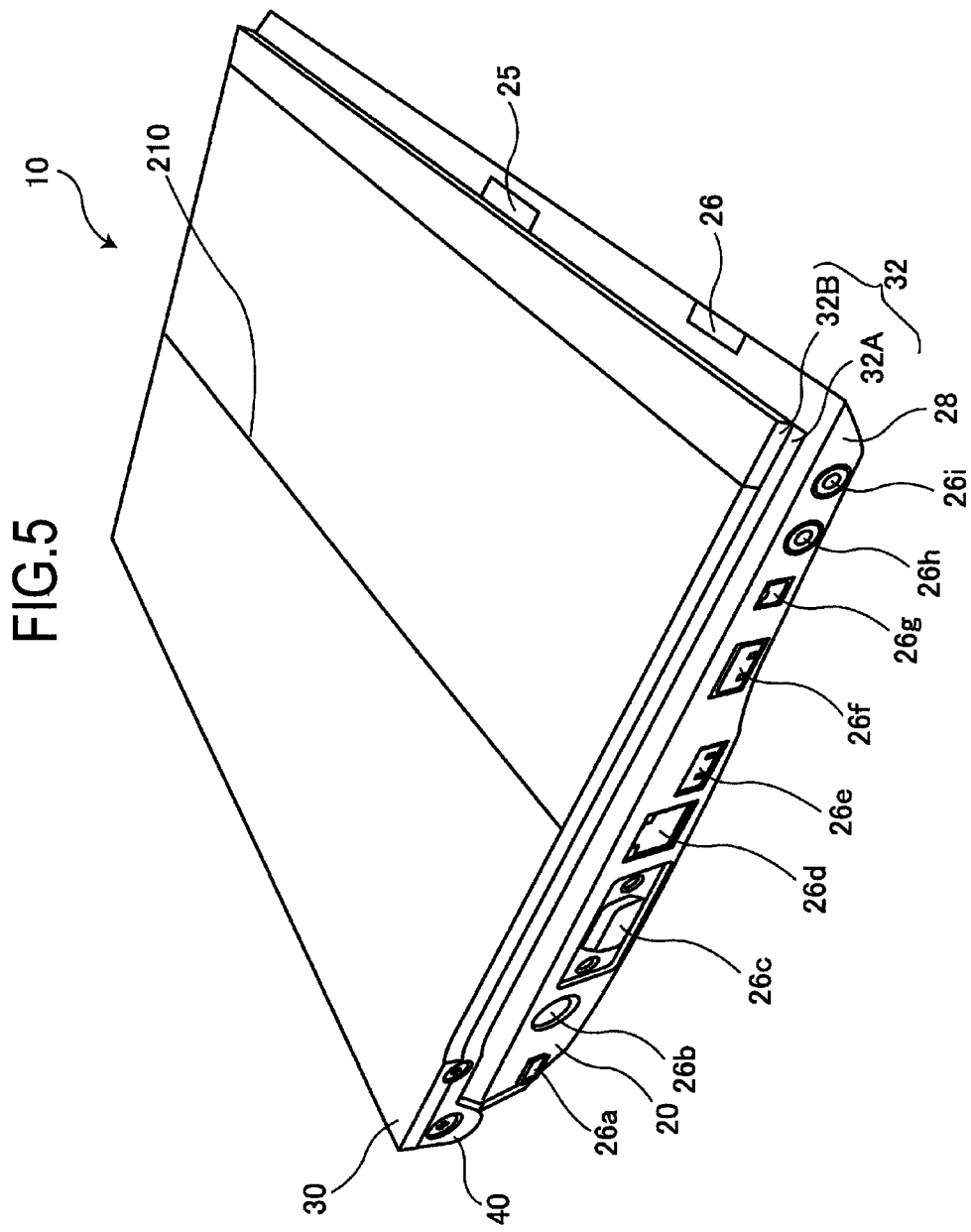
FIG. 5 is a diagram illustrating the state in which a display unit is closed on a main unit.

FIG. 5 is a diagram illustrating the state in which the display unit 30 is closed on the main unit 20.

As shown in FIG. 5, the back cover 32B of the display housing 32 has a projecting portion 210 obtained by bending a plate member at a central area of the personal computer 10 in the front-rear direction. The projecting portion 210 extends in the longitudinal direction of the personal computer 10 to both sides of the display housing 32. The projecting portion 210 is an example of a projecting portion according to the present embodiment.

The projecting portion 210 of the back cover 32B serves to suppress deflection of the back cover 32B. As a result, the strength of the display housing 32 is increased. Thus, according to the present embodiment, the display housing 32 is made of a thin, light material but has a high strength. Therefore, the weight of the apparatus can be reduced and the strength thereof can be increased at the same time.

Figure 6:
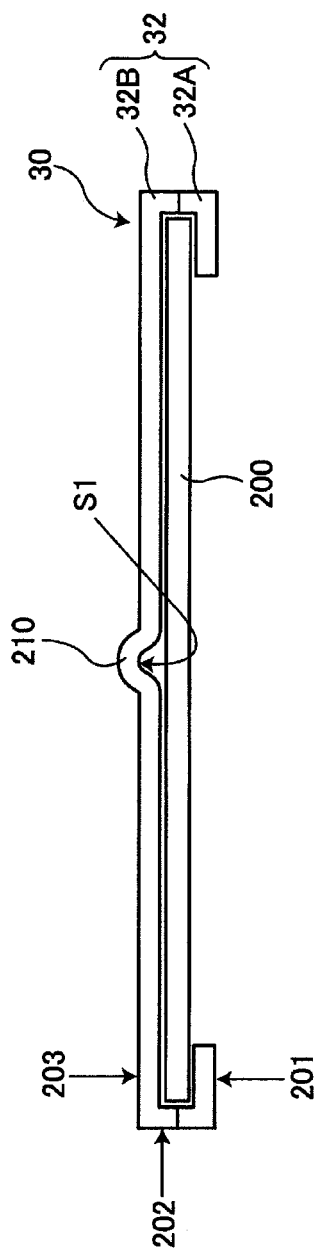
FIG. 6 illustrates a sectional view of the display unit taken along a plane perpendicular to a longitudinal direction of a personal computer.

FIG. 6 illustrates a sectional view of the display unit 30 taken along a plane perpendicular to the longitudinal direction of the personal computer 10.

The display housing 32 includes the front cover 32A and the back cover 32B. The display housing 32 has a front face portion 201, a back face portion 203, and side-face portions 202. The front face portion 201 covers a peripheral region of a front face of a liquid crystal panel 200 on which the display screen 31 is provided. The back face portion 203 covers a back face of the liquid crystal panel 200. The side-face portions 202 connect the front face portion 201 and the back face portion 203 to each other. The liquid crystal panel 200 is an example of a glass assembly according to the present embodiment. The liquid crystal panel 200 is also an example of a display panel according to the present embodiment. The front face portion 201 is an example of a front face portion according to the present embodiment. The side-face portions 202 are an example of sidewall portions according to the present embodiment. The back face portion 203 is an example of a back face portion according to the present embodiment.

The central area of the back face portion 203 is an area where the display housing 32 is most severely deflected when an impact from, for example, falling is applied. According to the present embodiment, the projecting portion 210 is formed at the central area so that the strength of the display housing 32 can be efficiently increased. In the personal computer 10, the space between the liquid crystal panel 200 and the display housing 32 is set to be small in order to reduce the size of the apparatus. The projecting portion 210 of the display housing 32 is formed by a bending process, and accordingly a space Si is formed between a front face of the projecting portion 210 and the liquid crystal panel 200. Therefore, even when a large impact is applied to the personal computer 10 and the display housing 32 is deflected, the projecting portion 210 is prevented from coming into contact with the liquid crystal panel 200. Moreover, the impact can be absorbed by the space Si and the liquid crystal panel 200 can be prevented from being damaged.

As described above, according to the present embodiment, the display housing 32 is made of a thin, light material but has a high strength. Therefore, the weight of the apparatus can be reduced and the strength thereof can be increased at the same time.

Another device incorporated in the personal computer 10 to increase the strength thereof will now be described.

The liquid crystal panel 200 having a small thickness is used as the display device 107 of the personal computer 10. In the display device 107 of the personal computer 10, the space between the display housing 32 and the liquid crystal panel 200 is reduced in order to reduce the size of the apparatus and increase the size of the display screen 31 at the same time. The liquid crystal panel is obtained by enclosing a liquid crystal element between a plurality of glass plates, and is easily damaged by an impact from, for example, falling. In addition, a wide-screen display device having a display screen that expands to areas near the side faces of a display housing has a problem that the impact from falling tends to be directly transmitted to the liquid crystal panel without being absorbed. The personal computer 10 according to the present embodiment incorporates a device for suppressing the occurrence of damage to the liquid crystal panel 200 due to an impact from falling.

Figure 7:
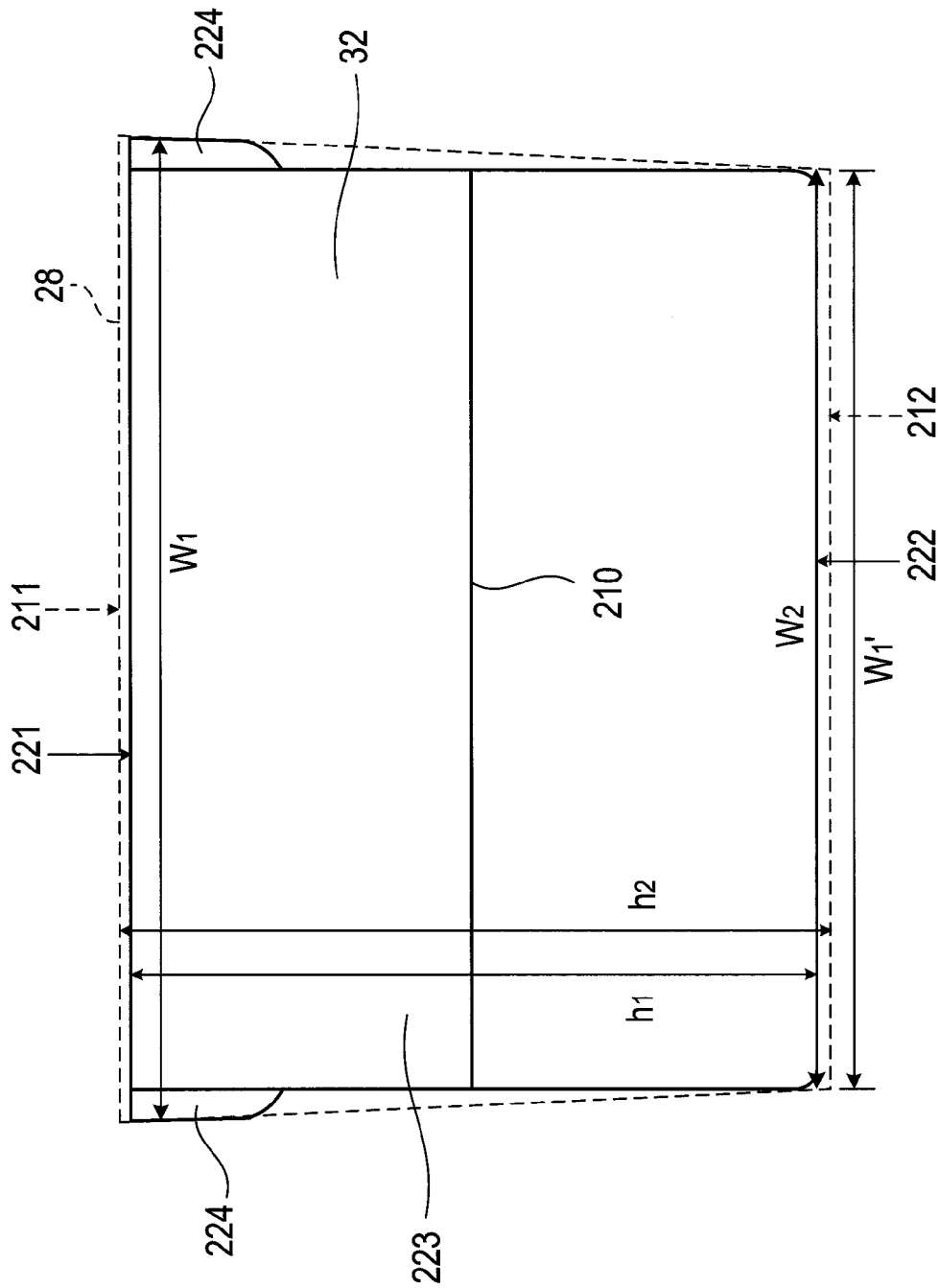
FIG. 7 is a diagram illustrating the dimensions of a display housing and a main housing.

FIG. 7 is a diagram illustrating the dimensions of the display housing 32 and the main housing 28.

In FIG. 7, the external shape of the main housing 28 is shown by the dashed line. The main housing 28 has a rear portion 211, to which the hinge units 40 are attached, and a front portion 212. The rear portion 211 and the front portion 212 are parallel to each other, and the width W1' of the front portion 212 is smaller than the width W1 of the rear portion 211. Thus, the main housing 28 has a trapezoidal shape when viewed from above. The main housing 28 is an example of a first housing according to the present embodiment. The rear portion 211 is an example of a first side portion according to the present embodiment. The front portion 212 is an example of a second side portion according to the present embodiment.

The display housing 32 has a rear portion 221, to which the hinge units 40 are attached, and a front portion 222. The width of the rear portion 221 is substantially equal to the width W1 of the rear portion 211 of the main housing 28, and the width W2 of the front portion 222 is smaller than the width W1 of the rear portion 221. The width W2 of the front portion 222 of the display housing 32 is set to be substantially equal to the width of a portion of the main housing 28 that corresponds to the front portion 222. The length h1 of the display housing 32 in the front-rear direction is smaller than the length h2 of the main housing 28 in the front-rear direction. The display housing 32 is an example of a second housing according to the present embodiment. The front portion 222 is an example of a third side portion according to the present embodiment. The rear portion 221 is an example of a fourth side portion according to the present embodiment. An area between the front portion 222 and the rear portion 221 is an example of a face portion according to the present embodiment.

The display housing 32 has a rectangular region 223 having the same width as the width W2 of the front portion 222 and protruding portions 224 that protrude in the width direction at the rear end of the rectangular region 223. The rectangular region 223 is an example of a rectangular region according to the present embodiment. An area in front of the front ends of the protruding portions 224 in the rectangular region 223 is an example of a first face portion according to the present embodiment. A total area including an area behind the front ends of the protruding portions 224 in the rectangular region 223 and areas of the protruding portions 224 correspond to an example of a second face portion according to the present embodiment.

Figure 8:
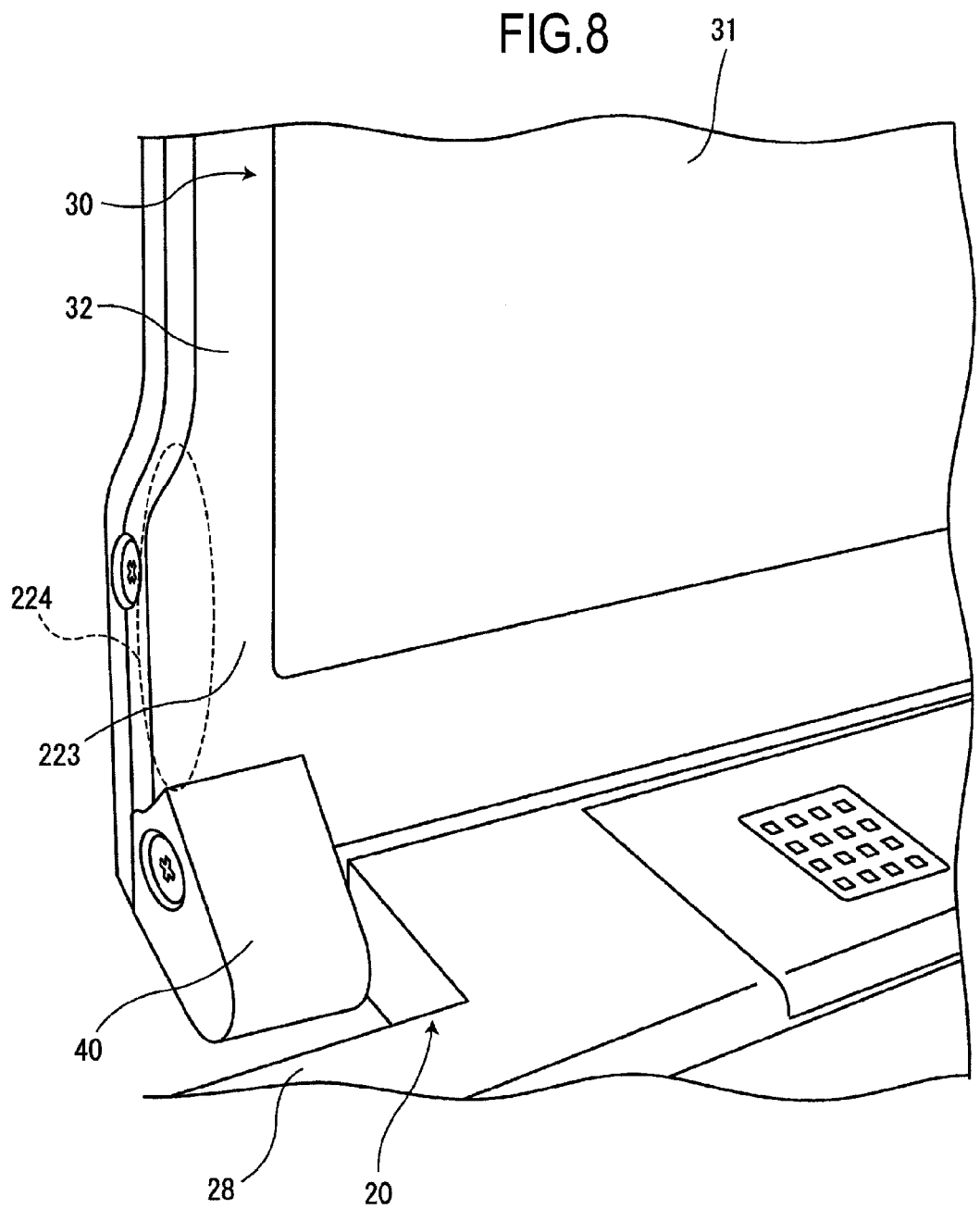
FIG. 8 illustrates an enlarged view of an area around a protruding portion in the state in which a display housing is opened with respect to a main housing.
Figure 9:
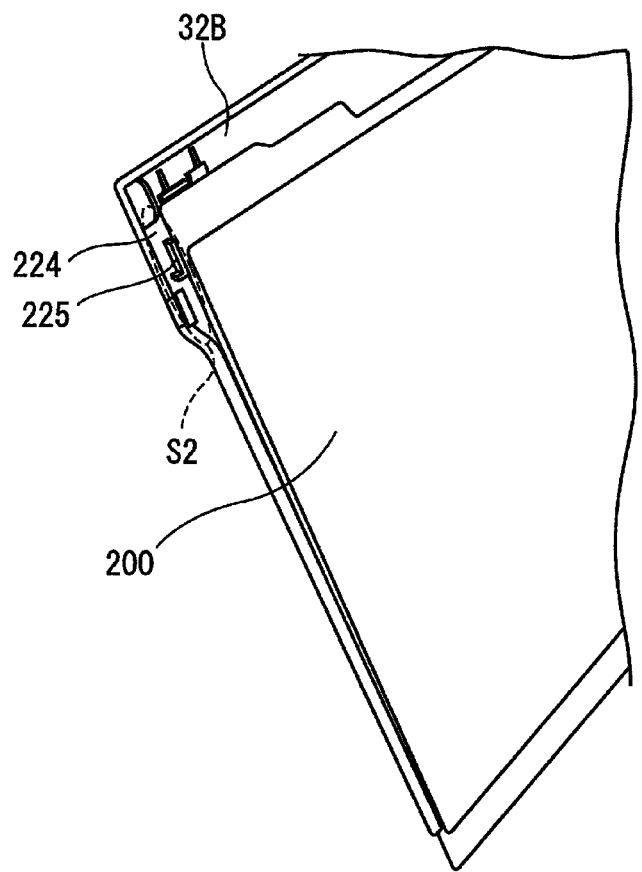
FIG. 9 is a diagram illustrating the state in which a front cover of a display housing is removed.

FIG. 8 illustrates an enlarged view of an area around one of the protruding portions 224 in a state in which the display housing 32 is opened with respect to the main housing 28. FIG. 9 is a diagram illustrating the state in which the front cover 32A of the display housing 32 is removed.

Referring to FIG. 8, the display housing 32 is connected to hinge units 40 at the side where the protruding portions 224, which protrude in the width direction from the remaining portion, are provided. In addition, as shown in FIG. 9, the back cover 32B of the display housing 32 has a rib 225 in each protruding portion 224 shown in FIG. 7 such that each rib 225 is located adjacent to the rectangular region 223. The liquid crystal panel 200 fits snugly between the ribs 225. Since the ribs 225 are provided, the liquid crystal panel 200 can be easily placed in the display housing 32 and the display device 107 can be easily manufactured. The rib 225 is an example of a rib according to the present embodiment. The back cover 32B provides a relatively large space S2 between the display housing 32 and the liquid crystal panel 200 at each end of a side where the hinge units 40 are attached. The size of the spaces S2 corresponds to the size of the protruding portions 224.

The center of gravity of the personal computer 10 is closer to the side where the hinge units 40 are provided than to the opposite side. Therefore, when the personal computer 10 falls, the personal computer 10 tends to fall with the hinge units 40 facing downward. According to the present embodiment, the impact from falling can be absorbed by the spaces S2 provided between the display housing 32 and the liquid crystal panel 200. Therefore, the damage to the liquid crystal panel 200 can be suppressed. In addition, according to the present embodiment, the personal computer 10 has a relatively large width only at the side where the hinge units 40 are provided. Thus, the increase in the size and weight of the apparatus is minimized.

As described above, the personal computer 10 according to the present embodiment has the large spaces S2 between the display housing 32 and the liquid crystal panel 200 only at the side where the hinge units 40 are provided. Therefore, the damage to the liquid crystal panel 200 can be suppressed without largely increasing the size of the apparatus.

Next, a device for reducing the size of the personal computer 10 will be described.

As described above with reference to FIG. 7, the main housing 28 of the personal computer 10 has a trapezoidal shape when viewed from above and the width of the rear portion 211 at which the hinge units 40 are attached is larger than that of the front portion 212.

Figure 10A:
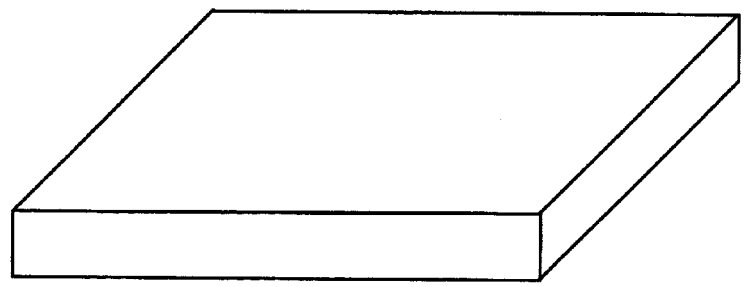
FIGS. 10A and 10B are diagrams illustrating the relationship between the shape and visual impression of a main housing.
Figure 10B:
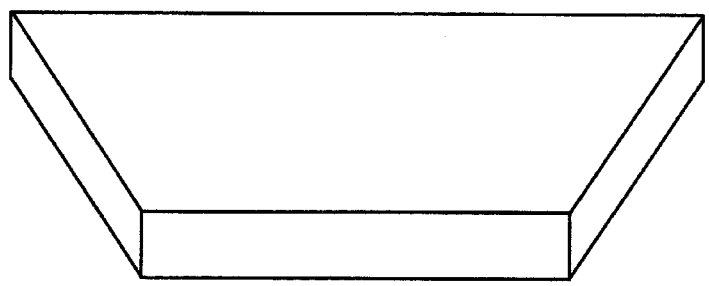

FIGS. 10A and 10B are diagrams illustrating the relationship between the shape and visual impression of the main housing 28.

FIG. 10A shows a rectangular solid, and FIG. 10B shows a body with trapezoidal top and bottom faces having the same volume as that of the rectangular solid shown in FIG. 10A. As is clear from FIG. 10B, when the body having the trapezoidal top and bottom faces is placed such that short sides of the trapezoidal faces face front, the body appears as if it is smaller than the rectangular solid having the same volume shown in FIG. 10A.

The personal computer 10 according to the present embodiment has a trapezoidal body, and the hinge units 40 are attached to the trapezoidal body at the long side thereof. Therefore, the user operates the personal computer 10 while it is placed such that the short side of the trapezoidal body faces the user. Thus, according to the present embodiment, the personal computer 10 appears to the user as if it is smaller than an apparatus of the related art having a rectangular solid housing with the same volume.

Figure 11:
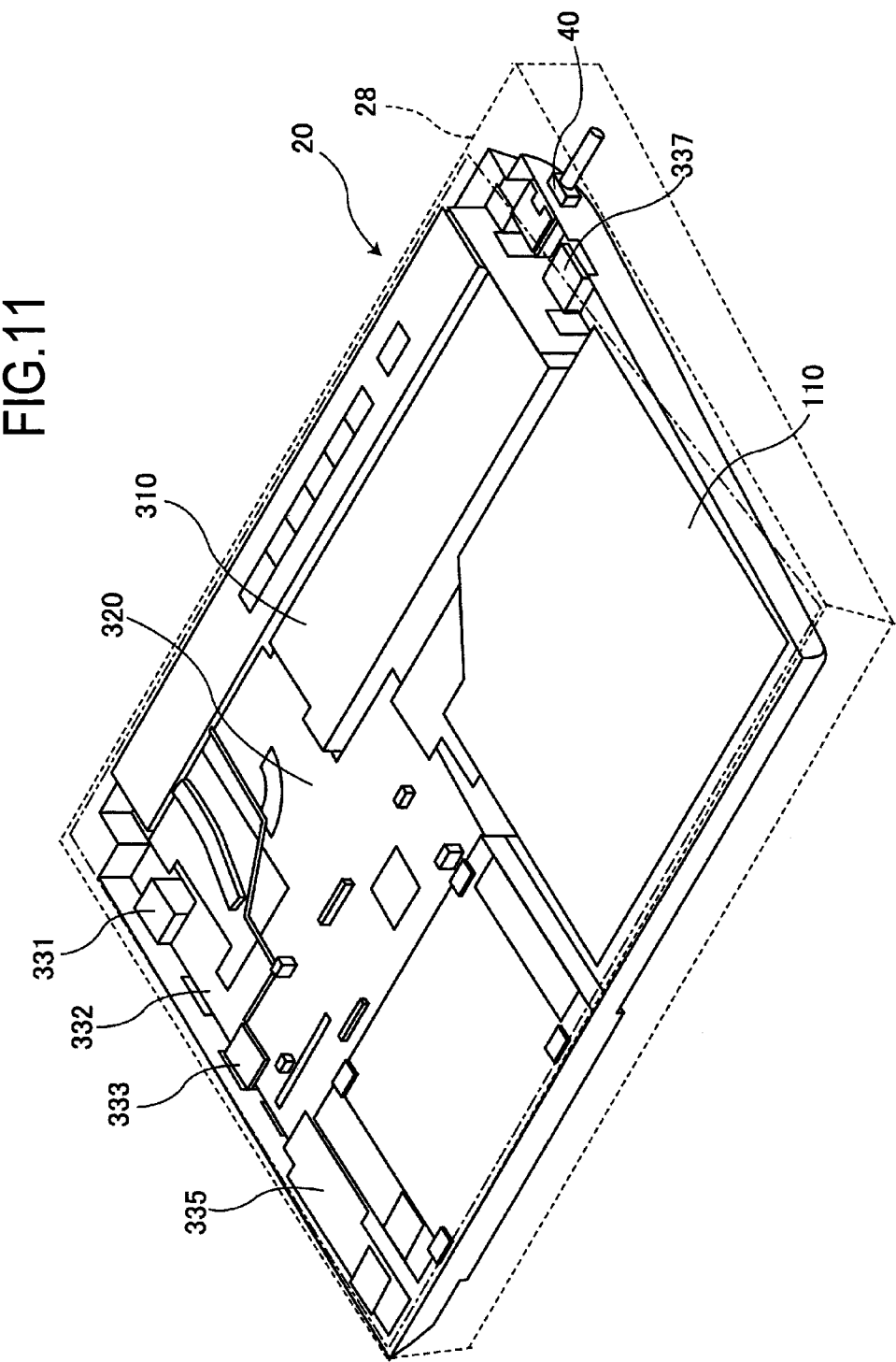
FIG. 11 is a diagram illustrating the internal structure of a main unit.

FIG. 11 is a diagram illustrating the internal structure of the main unit 20.

In FIG. 11, the external shape of the main housing 28 is shown by the dashed line, and the rectangular region having a width that is equal to the length of the short side of the trapezoidal main housing 28 is shown by the dot-dash line. As shown in FIG. 11, the main housing 28 houses a power-source control circuit 331, a display control circuit 332, a communication control circuit 333, an input-output control circuit (not shown in FIG. 11), an audio circuit 335, an expansion processing circuit (not shown in FIG. 11), the optical disk drive 110, and a data conversion circuit 337. The main housing 28 also houses other electronic components such as a cooling mechanism 320 and a rechargeable battery 310. The power-source control circuit 331 is connected to the connector 26b for the power supply module shown in FIG. 2. The display control circuit 332 is connected to the connector 26c for the external monitor. The communication control circuit 333 is connected to the connector 26d for the LAN cable. The input-output control circuit is connected to the USB connectors 26e, 26f, and 27c. The audio circuit 335 is connected to the connector 26g for the audio jack, the connector 26h for the microphone, and the connector 26i for the headphone. The expansion processing circuit is connected to the expansion card slot 27a shown in FIG. 3. The optical disk drive 110 is connected to the optical disk slot 27b. The data conversion circuit 337 is connected to the modem connector 27d. The cooling mechanism 320 dissipates heat generated in the main housing 28. The electronic components shown in FIG. 11 are examples of processing circuits according to the present embodiment, and are also examples of electronic components according to the present embodiment.

As shown in FIG. 11, a rear section of the main housing 28 where the hinge units 40 are attached is less dense compared to a front section thereof. Therefore, in the personal computer 10, spaces for absorbing impact can be provided between the main housing 28 and the hinge units 40. As a result, the impact resistance of the personal computer 10 can be increased. Some of the electronic components, such as the data conversion circuit 337 shown in FIG. 11, are disposed outside the rectangular region of the main housing 28 shown by the dot-dash line. The width of the main housing 28 at the front edge thereof can be reduced by placing the electronic components in the space provided in the rear section of the main housing 28. As a result, according to the present embodiment, the personal computer 10 can be designed such that it appears to be small.

As described above, according to the present embodiment, the main housing 28 is formed in a trapezoidal shape such that the width thereof in the front section is smaller than the width thereof in the rear section. Therefore, the apparatus appears to be small even when the volume of the main housing 28 is increased.

A device for reducing the size of the cooling mechanism 320 shown in FIG. 11 will now be described.

Figure 12:
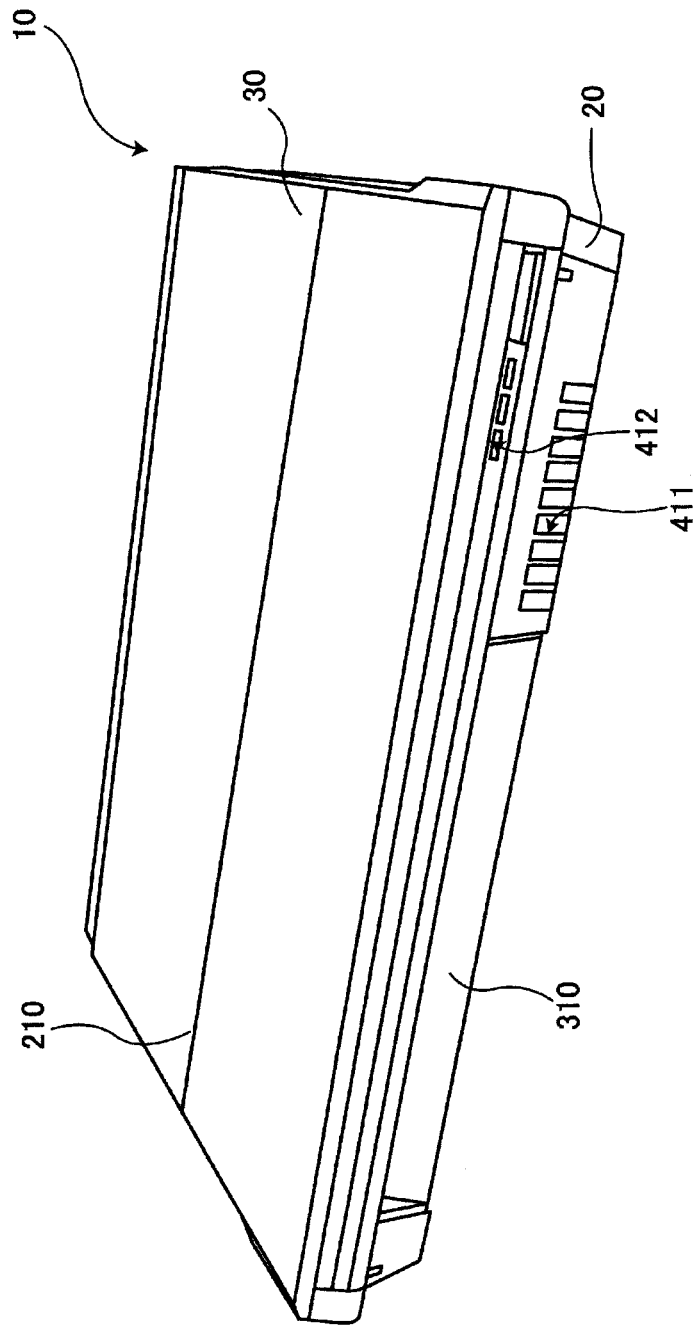
FIG. 12 illustrates a rear view of a personal computer in the state in which a display unit is closed on a main unit.

FIG. 12 illustrates a rear view of the personal computer 10 in the state in which the display unit 30 is closed on the main unit 20.

The rechargeable battery 310 is fitted to a portion of the main unit 20 that defines the rear face of the personal computer 10. Inlets 412 and outlets 411, which form a part of the cooling mechanism 320, are formed in the above-mentioned portion of the main unit 20. The inlets 412 are disposed above the outlets 411. Therefore, the risk that heat that remains in a region around the bottom of the personal computer 10 will be drawn in through the inlets 412 can be reduced. As a result, heat dissipation efficiency of the personal computer 10 can be maintained even if the personal computer 10 is continuously used.

Figure 13:
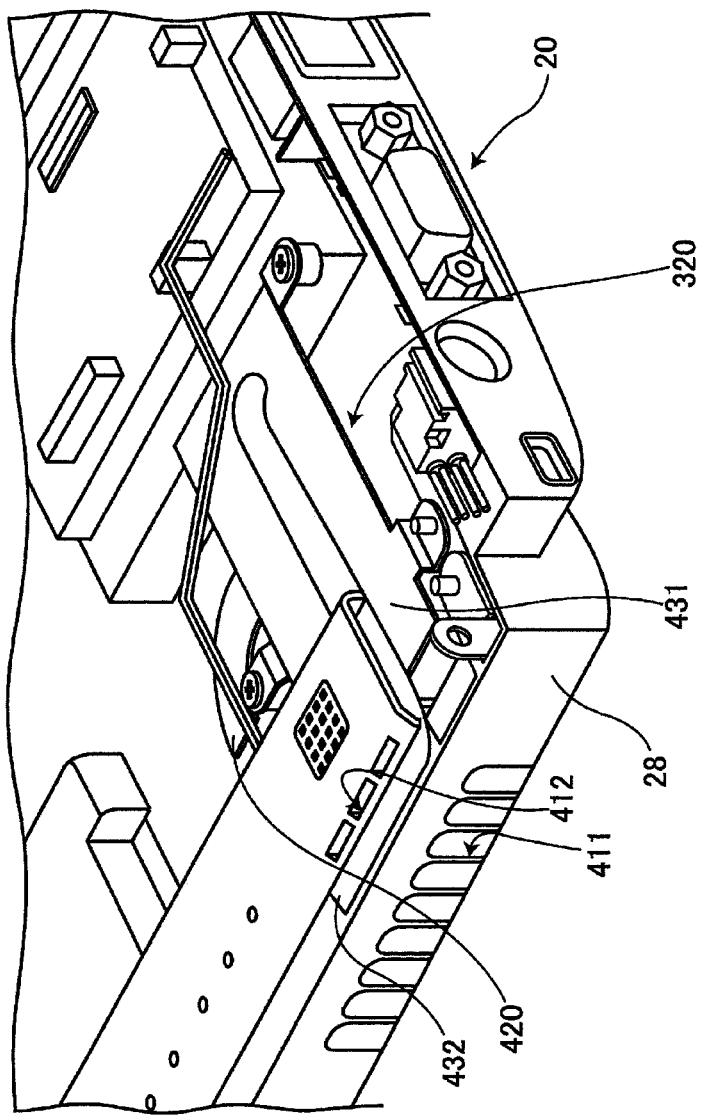
FIG. 13 is a diagram illustrating the internal structure of a section around a cooling device in a main unit.

FIG. 13 is a diagram illustrating the internal structure of a section around the cooling mechanism 320 in the main unit 20.

As shown in FIG. 13, the cooling mechanism 320 includes a metal plate 431, a heat pipe 432, and a cooling fan 420. The metal plate 431 is disposed above the electronic components, and heat generated by the electronic components is transferred to the metal plate 431. The heat pipe 432 is attached to the metal plate 431, and guides the heat transferred to the metal plate 431 to the outlets 411. The cooling fan 420 discharges the heat guided through the heat pipe 432 together with air. The cooling fan 420 is an example of a cooling fan according to the present embodiment.

Figure 14:
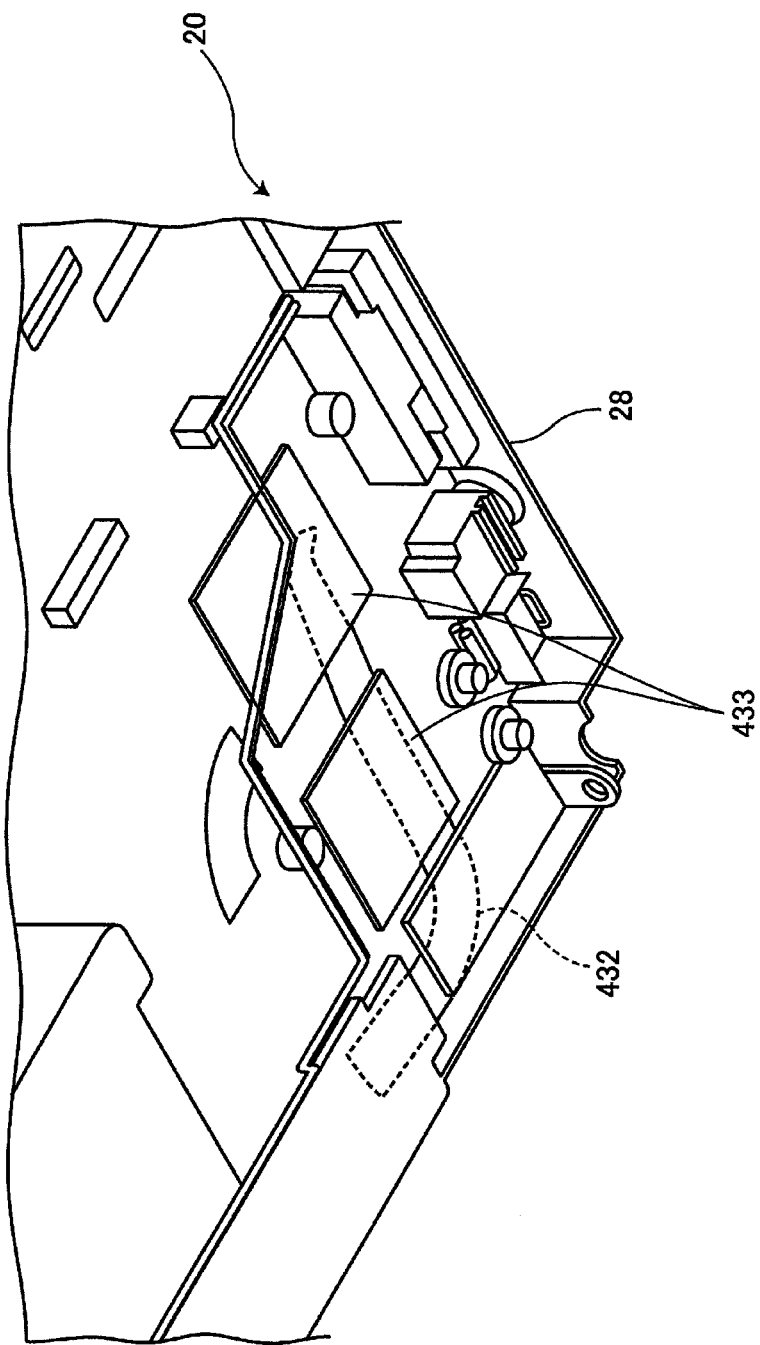
FIG. 14 is a perspective view showing electronic components disposed under a metal plate shown in FIG. 13.

FIG. 14 is a perspective view showing the electronic components disposed under the metal plate 431 shown in FIG. 13.

The heat pipe 432 extends to the outlets 411 along the metal plate 431 through positions above a plurality of processing circuits 433 on which CPUs, controllers, etc., are mounted.

Figure 15:
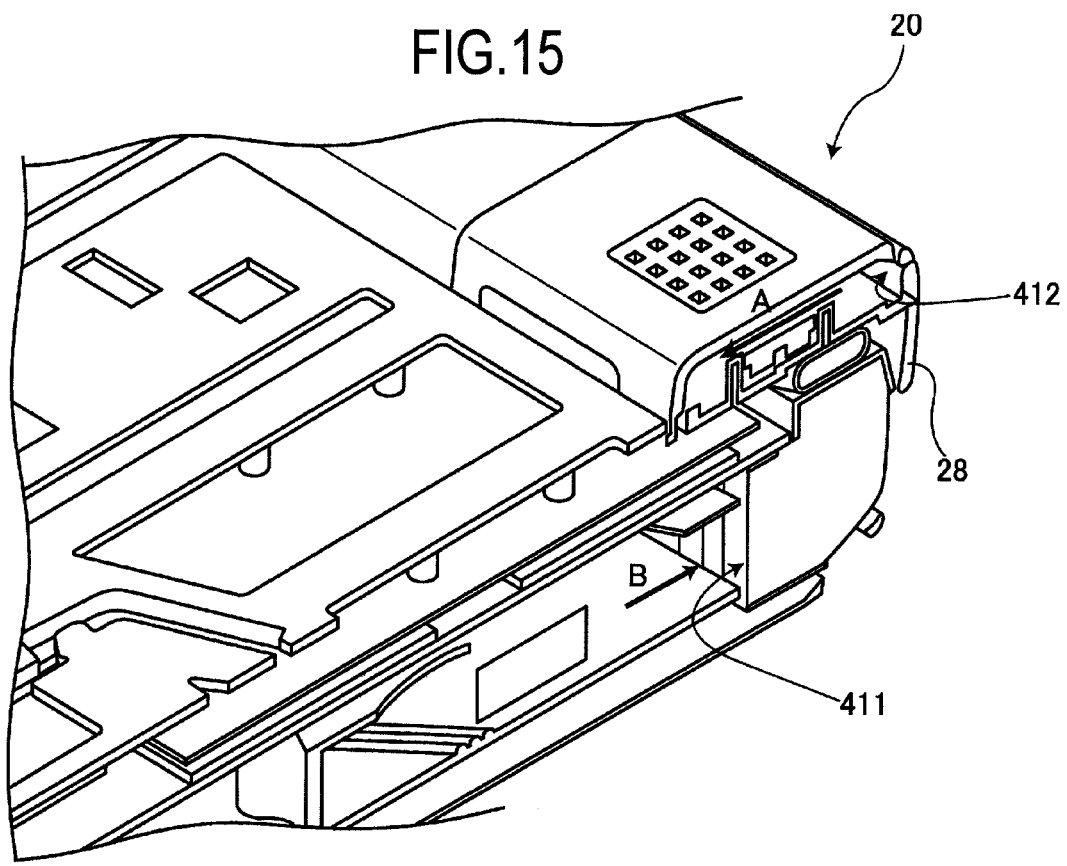
FIG. 15 is a diagram illustrating air passages.

FIG. 15 is a diagram illustrating air passages.

Air that flows in through the inlets 412 is guided to the inside of the main housing 28, as shown by arrow A. Heat generated by the processing circuits 433 shown in FIG. 14 is transferred to the metal plate 431 and is guided along the heat pipe 432 to an area near the outlets 411. The cooling fan 420 causes the air taken in through the inlets 412 to flow toward the outlets 411. This air absorbs the heat transferred by the heat pipe 432. The air, which has become warm by absorbing heat, is discharged through the outlets 411 as shown in by arrow B. The personal computer 10 according to the present embodiment has the inlets 412 and the outlets 411 in the same face of the main housing 28. Therefore, the heat pipe 432, the cooling fan 420, etc., are placed in a small space in the personal computer 10 according to the present embodiment. As a result, the overall size of the apparatus is reduced.

Figure 16:
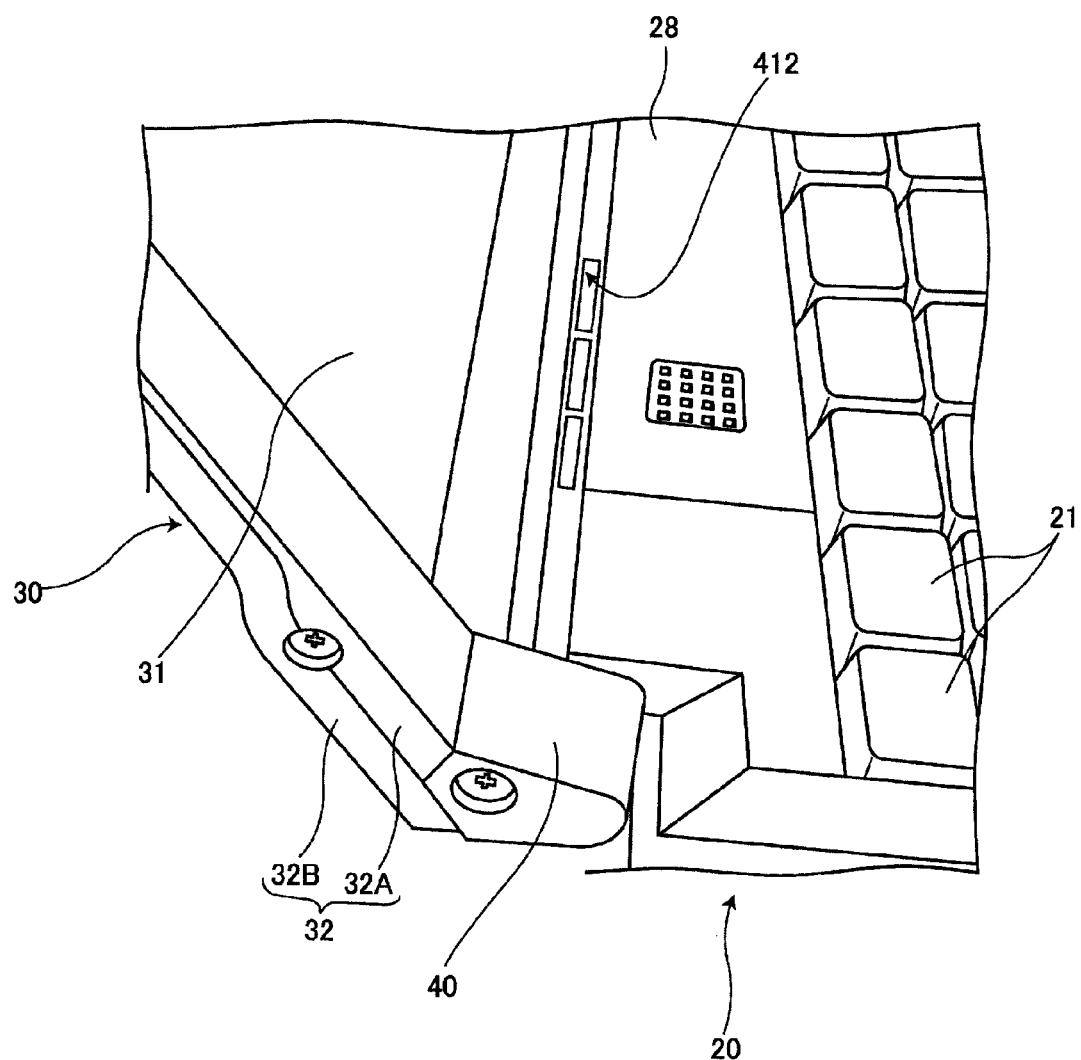
FIG. 16 is a perspective view showing a front side of a personal computer in the state in which a display unit is opened with respect to a main unit.
Figure 17:
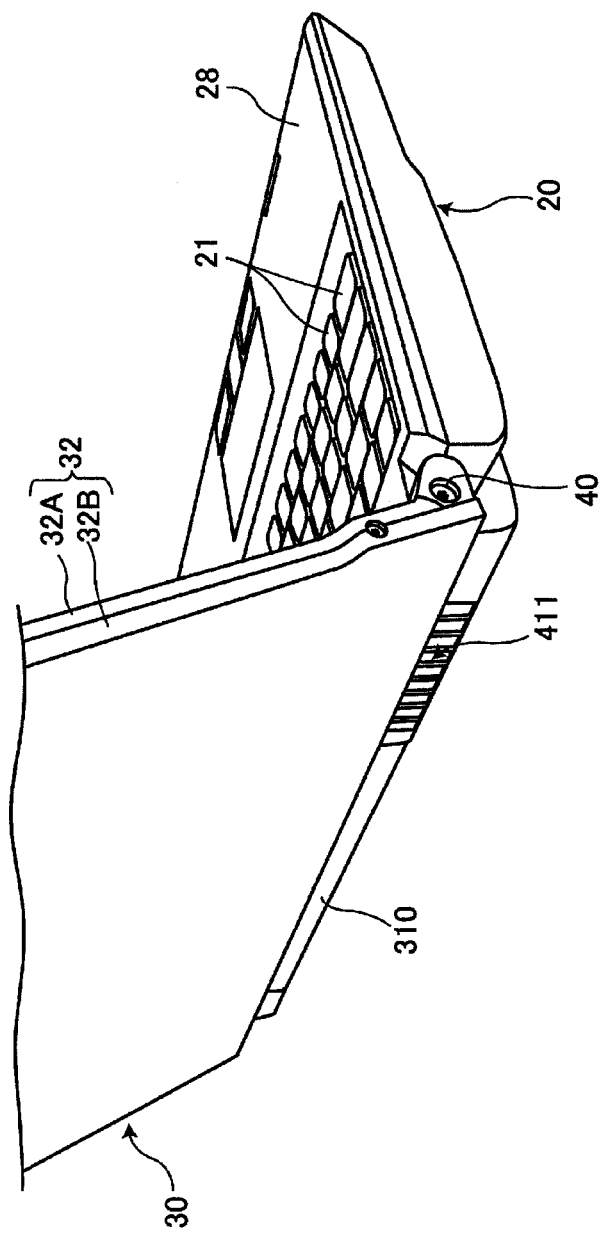
FIG. 17 is a perspective view showing a rear side of a personal computer in the state in which a display unit is opened with respect to a main unit.

FIG. 16 is a perspective view showing the front side of the personal computer 10 in a state in which the display unit 30 is opened with respect to the main unit 20. FIG. 17 is a perspective view showing the rear side of the personal computer 10 in a state in which the display unit 30 is opened with respect to the main unit 20.

In a state in which the display unit 30 is opened, as shown in FIG. 16, the inlets 412 are positioned in front of the display unit 30. In addition, in this state, as shown in FIG. 17, the outlets 411 are positioned behind the display unit 30. In the case where the inlets and the outlets are provided in the same face of a housing, there is a risk that the warm air discharged through the outlets will be drawn into the housing through the inlets again. In such a case, the heat dissipation efficiency will be reduced. In the personal computer 10 according to the present embodiment, the outlets 412 and the inlets 411 are divided from each other by the display unit 30. Therefore, the heat dissipation efficiency can be maintained.

In addition, as shown in FIG. 12, the inlets 412 are exposed at the outer surface of the personal computer 10 even when the display unit 30 is in the closed state. Therefore, even when the display unit 30 is closed, air can be taken in through the inlets 412. Thus, heat generated during the operation performed while the display unit 30 is closed can also be reliably dissipated to the outside of the main housing 28.

As described above, according to the personal computer 10 of the present embodiment, the size of the apparatus can be reduced and the heat dissipation efficiency can be increased at the same time.

A device for improving the operability of the personal computer 10 will now be described.

Laptop personal computers are not only operated while being placed on a desk or the like but may also be operated while being held with one hand by a user. The personal computer 10 according to the present embodiment has a structure for allowing the display unit 30 to be quickly and easily opened even when the personal computer 10 is operated while being held with one hand by a user.

Figure 18:
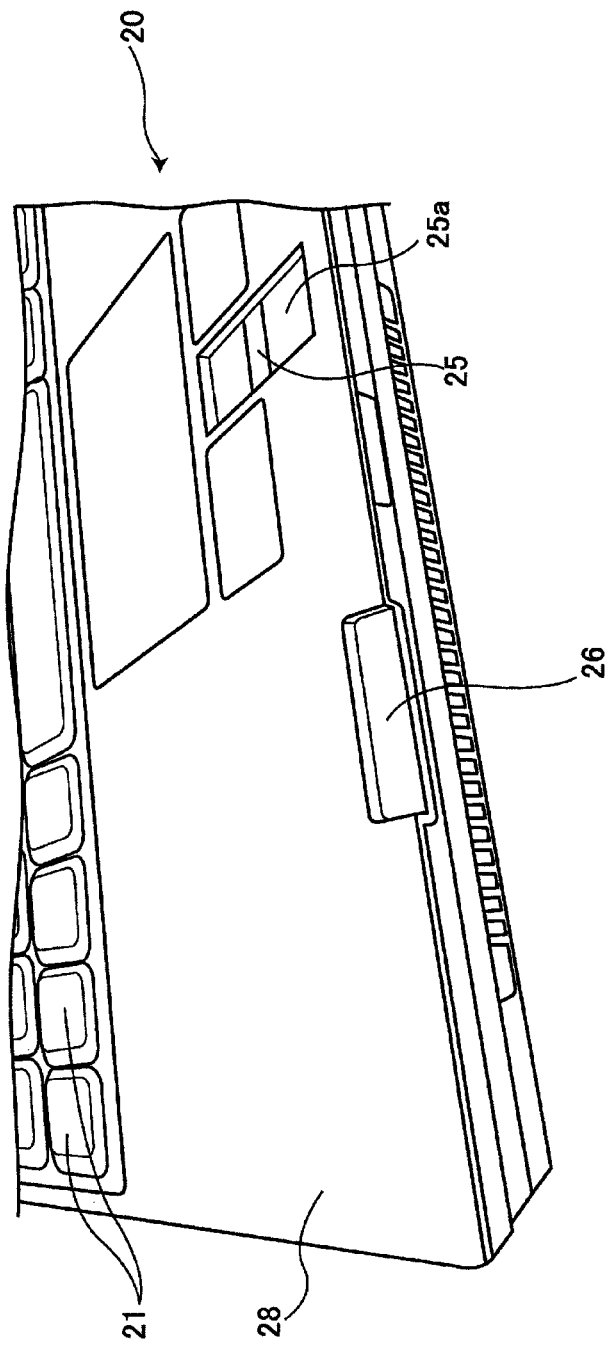
FIG. 18 is an enlarged view of a section around the front edge of a main unit.

FIG. 18 is an enlarged view of a section around the front edge of the main unit 20.

The main unit 20 has the fingerprint sensor 25 and the medium slot 26 in a front section thereof. The fingerprint sensor 25 has a guide 25a for guiding a finger to the fingerprint sensor 25. The main housing 28 is shaped such that portions where the medium slot 26 and the guide 25a are provided are recessed. The medium slot 26 and the guide 25a are examples of recesses according to the present embodiment. The fingerprint sensor 25 is an example of a fingerprint sensor according to the present embodiment. The guide 25a is an example of a guide used in a fingerprint reading operation according to the present embodiment.

As shown in FIG. 7, the length h2 of the main housing 28 in the front-rear direction is larger than the length h1 of the display housing 32 in the front-rear direction. Therefore, the medium slot 26 and the guide 25a are exposed at the front surface of the personal computer 10 even when the display housing 32 is closed. The front portion 212 of the main housing 28 is also an example of a first front edge portion according to the present embodiment. The rear portion 211 is also an example of a first rear edge portion according to the present embodiment. The front portion 222 of the display housing 32 is also an example of a second front edge portion according to the present embodiment. The rear portion 221 is also an example of a second rear edge portion according to the present embodiment.

Figure 19:
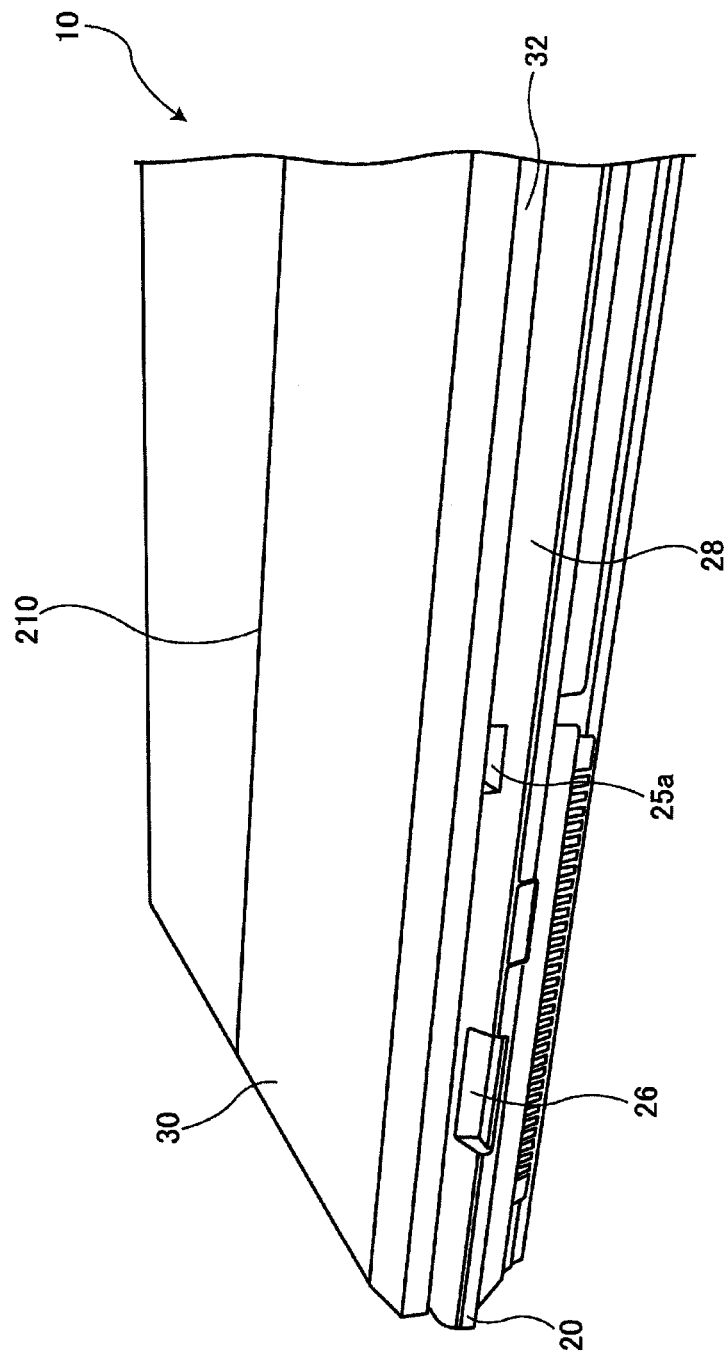
FIG. 19 is a diagram illustrating a section around the front edge of a personal computer in the state in which a display unit is closed.

FIG. 19 is a diagram illustrating a section around the front edge of the personal computer 10 in the state in which the display unit 30 is closed.

As shown in FIG. 19, the main unit 20 protrudes forward from the display unit 30. Therefore, the medium slot 26 and the guide 25a are exposed at the front surface of the personal computer 10. The user can easily open the display unit 30 by inserting a finger into the medium slot 26 or the guide 25a. In addition, since the medium slot 26 is formed in the front section of the main housing 28, the user can load a small recording medium while the display unit 30 is closed. In addition, since the fingerprint sensor 25 is disposed in the front section of the main housing 28, the guide 25a having a sufficient length can be provided. As a result, the accuracy of fingerprint authentication can be improved. In the personal computer 10, the medium slot 26 is formed so as to face not only forward but also upward in the personal computer 10. Therefore, the user can visually check whether or not the small recording medium is loaded while, for example, operating the personal computer 10. As described above, the medium slot 26 and the fingerprint sensor 25 are preferably provided in the front section of the main housing 28. According to the personal computer 10 of the present embodiment, the operability is improved without forming an additional component, such as a pressing button, or forming an additional recess in the main housing 28. Thus, the operability is improved without increasing the size or the manufacturing cost of the apparatus.

Each hinge unit 40 of the personal computer 10 has a device for facilitating the operation of opening and closing the display unit 30.

Figure 20:
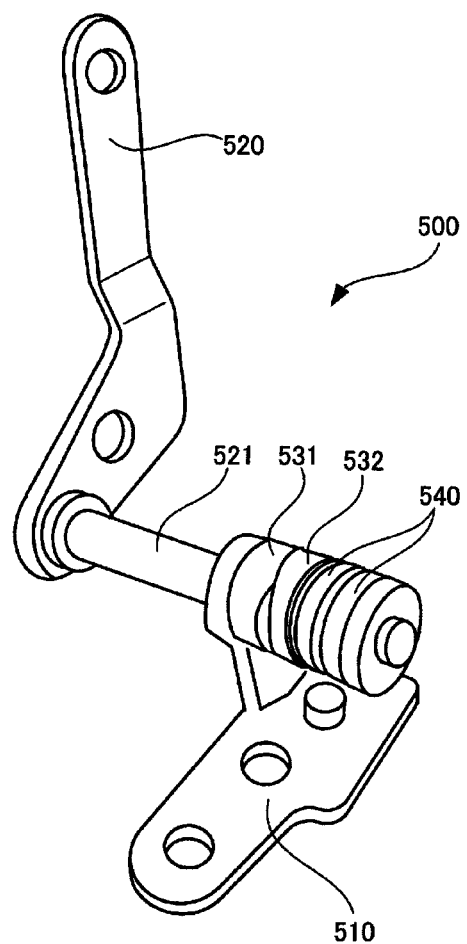
FIG. 20 illustrates an enlarged view of a hinge part included in a hinge unit.

FIG. 20 illustrates an enlarged view of a hinge part 500 included in one of the hinge units 40.

The hinge part 500 includes a main-body fixing portion 510, a display fixing portion 520, a rotating shaft 521, a fixed cam portion 531, a rotating cam portion 532, and a disc spring 540. The main-body fixing portion 510 is attached to the main unit 20. The display fixing portion 520 is attached to the display unit 30. The rotating shaft 521 is used for pivoting the display fixing portion 520 with respect to the main-body fixing portion 510. The fixed cam portion 531 is fixed to the main-body fixing portion 510. The rotating cam portion 532 rotates together with the rotating shaft 521. The disc spring 540 presses the rotating cam portion 532 against the fixed cam portion 531. The fixed cam portion 531 and the rotating cam portion 532 have tapered surfaces that can be fitted to each other.

FIG. 20 shows a state in which the display unit 30 is opened with respect to the main unit 20 by 90 degrees. In the state in which the display unit 30 is opened with respect to the main unit 20 by 90 degrees, the tapered surfaces of the rotating cam portion 532 and the fixed cam portion 531 are not fitted to each other. In this state, rotation of the rotating cam portion 532 in a direction such that the display unit 30 is closed is locked.

Figure 21:
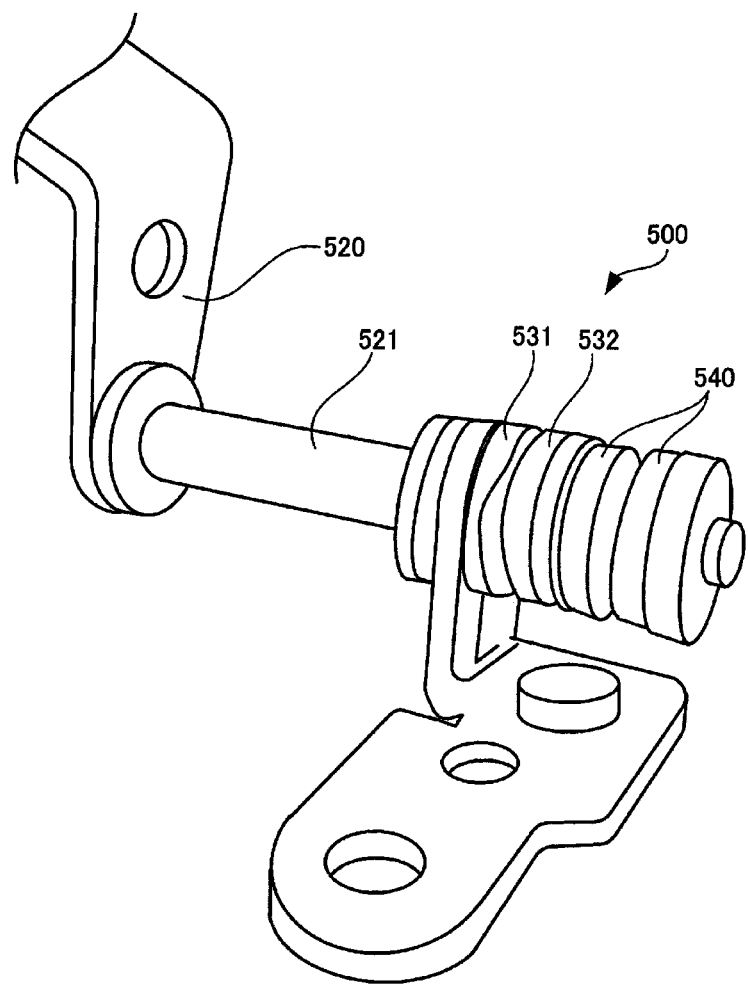
FIG. 21 is a diagram illustrating the state of a hinge part while a display unit is being closed.
Figure 22:
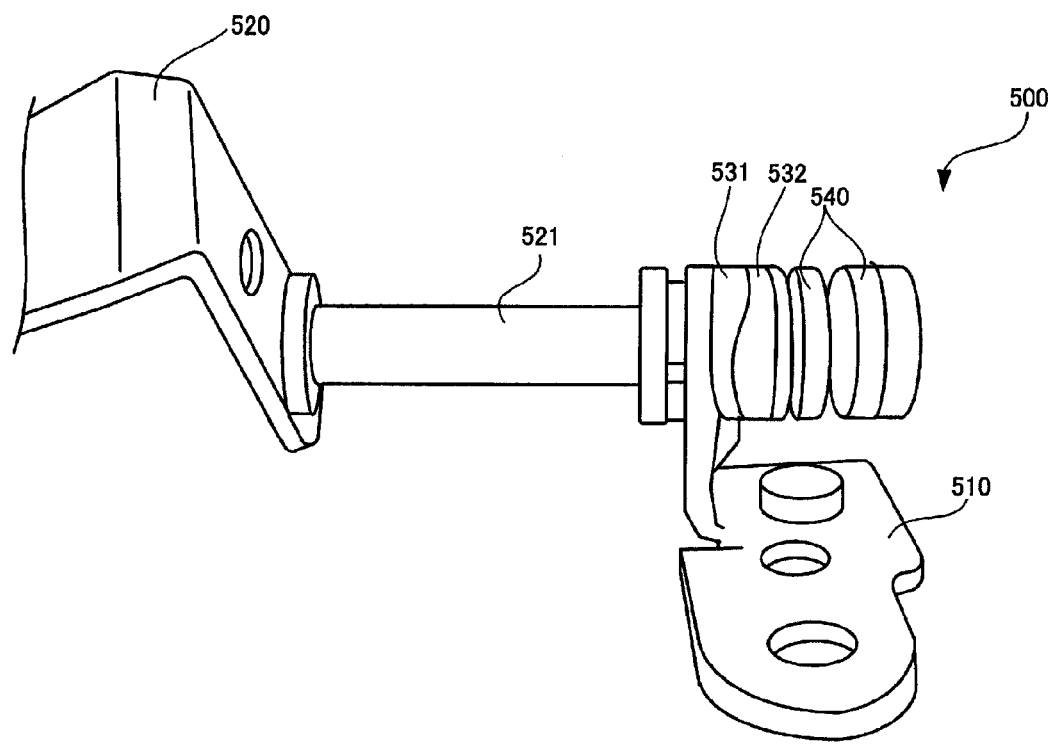
FIG. 22 is a diagram illustrating the state of a hinge part when a display unit is closed on a main unit.

FIG. 21 is a diagram illustrating a state of the hinge part 500 while the display unit 30 is being closed. FIG. 22 is a diagram illustrating the state of the hinge part 500 when the display unit 30 is closed on the main unit 20.

When the user starts to close the display unit 30, the display fixing portion 520 starts to pivot. Accordingly, the rotating cam portion 532 rotates and the lock is released. When the display unit 30 reaches a given angle, the tapered surfaces of the rotating cam portion 532 and the fixed cam portion 531 slide along each other in such a direction that the tapered surfaces become fitted to each other. As a result, the display unit 30 is urged toward the main unit 20. When the display unit 30 is closed on the main unit 20, as shown in FIG. 22, the tapered surfaces of the rotating cam portion 532 and the fixed cam portion 532 become fitted to each other.

According to the personal computer 10, when the display unit 30 reaches a given angle, the display unit 30 is urged in such a direction that the display unit 30 becomes closed. Therefore, the user can easily close the display unit 30 with one hand.

The electronic apparatus according to the first embodiment has been described above. Next, an electronic apparatus according to a second embodiment will now be described. In the electronic apparatus according to the second embodiment, the shape of the back cover that covers the back surface of the liquid crystal panel differs from that in the first embodiment. Other structures of the second embodiment are similar to those in the first embodiment. Therefore, elements similar to those in the first embodiment are denoted by the same reference numerals, and explanations thereof will thus be omitted. Only the structures different from those in the first embodiment will be described.

Figure 23:
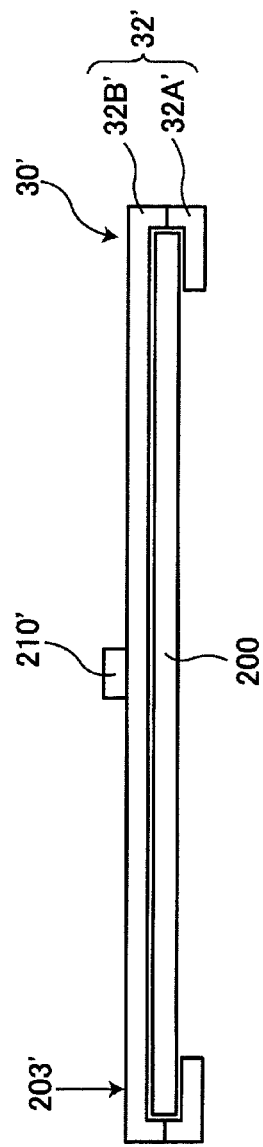
FIG. 23 illustrates a sectional view of another display unit taken along a plane perpendicular to a longitudinal direction of a personal computer.

FIG. 23 illustrates a sectional view of a display unit 30' taken along a plane perpendicular to the longitudinal direction of the personal computer 10.

The display unit 30' according to the present embodiment includes a projecting portion 210' on a back face portion 203' defined by a back cover 32B'. In the display unit 30' of the present embodiment, the projecting portion 210' is placed on a plate member instead of being formed by bending the plate member. No space like the space S1 shown in FIG. 6 is provided between the liquid crystal panel 200 and the back face portion 203'.

As described above, the projecting portion may be provided on the display housing by a method other than the bending process. If the bending process is applied, the space S1 is formed between the liquid crystal panel 200 and the back face portion 203, and the space S1 provides advantages that the impact from falling can be absorbed and the projecting portion can be easily formed.

The electronic apparatus according to the second embodiment has been described above. Next, an electronic apparatus according to a third embodiment will now be described. Also in the electronic apparatus according to the third embodiment, the shape of the back cover that covers the back surface of the liquid crystal panel differs from that in the first embodiment. Therefore, only the structures different from those in the first embodiment will be described.

Figure 24:
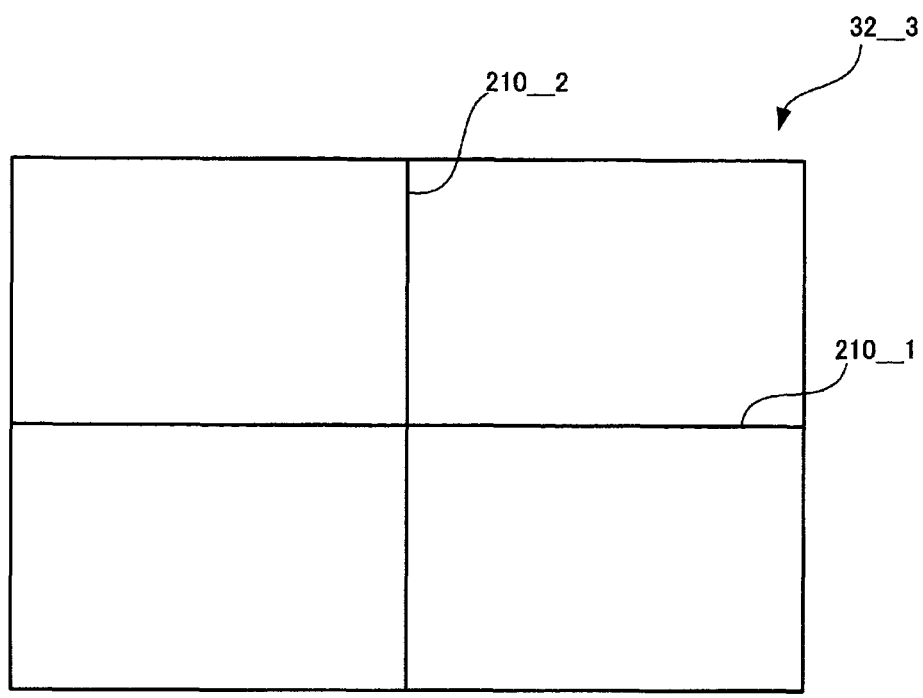
FIG. 24 illustrates a rear view of a display housing.

FIG. 24 illustrates a rear view of a display housing 32_3.

The display housing 32_3 according to the present embodiment includes not only a first projecting portion 210_1 that extends in a longitudinal direction of the liquid crystal panel 200 but also a second projecting portion 210_2 that extends perpendicular to the first projecting portion 210_1 on the rear surface thereof.

Since the second projecting portion 210_2 that extends perpendicular to the first projecting portion 210_1 is provided in addition to the first projecting portion 210_1, the strength of the display housing 32_3 is further increased.

In the above-described embodiments, a personal computer is explained as an example of an electronic apparatus. However, the electronic apparatus may also be other kinds of apparatuses such as a PDA, a game apparatus, a television set, and a mobile phone.

In addition, in above-described embodiments, a liquid crystal panel is explained as an example of a display panel. However, the display panel is not limited to a liquid crystal panel, and may also be any type of display panel such as a plasma display, a field emission display, and an organic EL display.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A laptop computer comprising: a trapezoidally shaped first housing having a first side portion, a second side portion, slanted side portions, a bottom surface portion, and a top surface portion, the second side portion having a width smaller than a width of the first side portion and being parallel to the first side portion, the slanted side portions connecting end points of the first side portion with respective end points of the second side portion, the first side portion including recesses at each end; a second housing; and a connecting portion connecting the first side portion of the first housing with the second housing such that the second housing is capable of being opened and closed with respect to the top surface portion of the first housing, the connecting portion residing in the recesses of the first side portion; the second housing including a third side portion, a fourth side portion, and protruding portions, the third side portion being adjacent to and parallel to the first side portion of the first housing in a closed state, the fourth side portion being adjacent to and parallel to the second side portion of the first housing in the closed state, the protruding portions being adjacent the connecting portion and extending from the third side portion to a point that is less than one-third of a distance between the third side portion and the fourth side portion, the second housing including a first portion adjacent the connecting portion and having a width that is wider than a width of a fourth portion of the first housing and substantially the same as a width of a third portion of the first housing and facing the third portion of the first housing in the closed state and a second portion having an entire width that is equal to the width of the fourth side portion, wherein the entire width of the second portion is less than an entire width between the slanted side portions at the fourth portion of the first housing and facing the fourth portion of the first housing in the closed state; wherein a keyboard is disposed on the top surface portion of the first housing; and wherein the second housing is a display unit of the laptop computer.

2. The laptop computer according to claim 1, wherein the first housing houses electronic components in a region outside a rectangular region defined by the second side portion and virtual normal lines extending from the end points of the second side portion to the first side portion.

3. The laptop computer according to claim 1, wherein the first housing is a main unit of the laptop computer, the main unit including a main processing circuit, and wherein the display unit being configured to display a processing result obtained by the main processing circuit.

4. A laptop computer comprising: a first housing includes a first side portion, a second side portion being parallel to the first side portion, slanted side portions, and a top surface portion, the second side portion having a width smaller than a width of the first side portion, the first side portion including recesses at each end, the slanted side portions connecting end points of the first side portion with respective end points of the second side portion; a second housing; and a hinge connecting the first housing with the second housing such that the second housing is capable of being opened and closed with respect to the top surface portion of the first housing, the hinge residing in the recesses of the first side portion; and the second housing including a third side portion, a fourth side portion, and protruding portions, the third side portion being adjacent to and parallel to the first side portion of the first housing in a closed state, the fourth side portion being adjacent to and parallel to the second side portion of the first housing in the closed state, the protruding portions being adjacent the connecting portion and extending from the third side portion to a point that is less than one-third of a distance between the third side portion and the fourth side portion, the second housing including a first portion adjacent the hinge and having a width that is wider than a width of a fourth portion of the first housing and substantially the same as a width of a third portion of the first housing and facing the third portion of the first housing in the closed state and a second portion having an entire width that is equal to the width of the fourth side portion, wherein the entire width of the second portion is less than an entire width between the slanted side portions at the fourth portion of the first housing and facing the fourth portion of the first housing in the closed state; wherein a keyboard is disposed on the top surface portion of the first housing; and wherein the second housing is a display unit of the laptop computer.

* * * * *